(12) United States Patent
Morinaga

(10) Patent No.: US 6,552,989 B2
(45) Date of Patent: Apr. 22, 2003

(54) DISK TRAY

(75) Inventor: Kenichi Morinaga, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/947,413

(22) Filed: Sep. 7, 2001

(65) Prior Publication Data

US 2002/0034146 A1 Mar. 21, 2002

(30) Foreign Application Priority Data

Sep. 19, 2000 (JP) ........................................ 2000-284027

(51) Int. Cl.⁷ ............................................. G11B 33/02
(52) U.S. Cl. ..................... 369/75.2; 369/77.1
(58) Field of Search .................. D14/260.1; 369/75.1, 369/75.2, 77.1, 77.2

(56) References Cited

U.S. PATENT DOCUMENTS 4,980,883 A * 12/1990 Mutou et al. ............... 360/133

2002/0036969 A1 * 3/2002 Kitamura ................... 369/75.2

FOREIGN PATENT DOCUMENTS

| EP | 0729146 A2 | * | 8/1996 |
| JP | 6-111444 A | * | 4/1994 |
| JP | 8-235713 | | 9/1996 |
| JP | 10-27407 | | 1/1998 |
| JP | 11-39762 | | 2/1999 |
| JP | 2001-6246 A | * | 1/2001 |
| JP | 2001-67761 A | * | 3/2001 |

* cited by examiner

*Primary Examiner*—William Klimowicz
*Assistant Examiner*—Julie Anne Watko
(74) *Attorney, Agent, or Firm*—Morgan, Lewis & Bockius LLP

(57) ABSTRACT

In a disc tray (T) having a tray main body (1) to which disc holders (3) are mounted at a plurality of portions in a periphery of a disc set portion, there are provided with a movable body (4) swinging the disc holder (3) through a push pull operation, and an operation knob (43) for pushing and pulling the movable body (4). A gear in a side of the disc holder (3) is engaged with a rack portion (42) in a side of the movable body (4)

11 Claims, 10 Drawing Sheets

DISK TRAY

BACKGROUND OF THE INVENTION

1. Technical Field

The present invention relates to a disc tray used at a time of taking a disc corresponding to a recording medium such as a magnetic disc, an optical disc and the like in and out a drive.

2. Related Art

There are descriptions about the disc tray in the Unexamined Japanese Patent Application Publication Nos. Hei8-235713, Hei10-27407 and Hei11-39762 and the like. In accordance with the publications, there is described a matter that disc holders serving for preventing a disc set in a disc set portion of a disc tray from falling away from the disc set portion are provided at a plurality of portions of the disc tray attached to the drive. It is necessary to prevent the disc from falling away in the disc holder mentioned above, mainly in the case of using the disc tray in a stand-up attitude, in other words, the case that the disc tray is equipped in the drive in a vertical attitude.

As mentioned above, in the disc tray equipped in the vertical attitude drive, it is necessary to hold the disc by the disc holder so as to prevent the disc from falling away the disc set portion, however, in the disc tray equipped in the horizontal attitude drive, it is not always necessary to hole the disc by the disc holder.

In this case, in the conventional disc tray, there are a structure in which hook-shaped disc holders are swingably provided at a plurality of portions around the disc set portion (the former) and a structure in which a disc holder is provided around the disc set portion so as to freely deform between a position capable of holding the disc and a position outside the position by using a resin elasticity (the latter).

[Problems to be Solved]

However, in the former, it is necessary to set the disc in the disc set portion and thereafter independently rotate the disc holders provided at a plurality of portions around the disc set portion one by one by fingers so as to move to the position capable of holding the disc. Accordingly, in the vertically placed drive structured such that the disc tray in the stand-up attitude is taken in and out, it is necessary to execute a troublesome operation of holding the disc by one hand at a time of attaching and detaching the disc to and from the disc tray and independently moving the disc holders at a plurality of portions one by one by another hand so as to hold the disc.

Further, in the latter, since it is necessary to execute an operation of pressing the disc to the disc set portion while elastically displacing the disc holders at a plurality of portions by the disc so as to expand the disc holders, there is a risk that the disc is damaged.

SUMMARY OF THE INVENTION

The present invention is made by taking the conditions mentioned above into consideration, and an object of the present invention is to provide a disc tray which simultaneously operates disc holders at a plurality of portions in the same manner only by operating one operation knob at a time of attaching and detaching a disc.

Further, another object of the present invention is to provide a disc tray which can set and take out a disc only by operating an operation knob only at an initial stage at a time of setting the disc to a disc set portion or at a time of taking out the disc from the disc set portion.

Further, the other object of the present invention is to provide a disc tray that can set a disc to a disc set portion or taking out from the disc set portion by using only one hand.

Further, the other object of the present invention is to provide a disc tray which can evacuate a disc holder to a position not standing in the way of taking a disc in and out in the case of using a drive in a horizontal attitude in which it is unnecessary to hold the disc by the disc holder.

[Means for Solving the Problems]

In accordance with the present invention, there is provided a disc tray having a tray main body to which disc holders are mounted at a plurality of portions in the periphery of a disc set portion so as to be capable of moving in and out between a closed position preventing a disc set in the disc set portion from falling down and an open position making it possible to take the disc in and out the disc set portion, provided with a movable body simultaneously moving each of the disc holders in and out between the closed position and the open position through a push pull operation, and an operation knob for pushing and pulling the movable body.

In accordance with the present invention, it is possible to employ the structure in which the respective disc holders swing so as to move in and out between the closed position and the open position, swing center portions of the respective disc holders and swing members corresponding to the respective disc holders are respectively connected to each other via respective rotary shafts rotatably extending through and inserted to a plurality of portions of the tray main body, and the movable body has a function of simultaneously moving the respective disc holders between the closed position and the open position via the respective rotary shafts by forward and backward swinging the respective swing members through the push pull operation, and in this case, it is possible to employ the structure in which the swing member are gears, and rack portions engaged with the gears forming the respective swing members are provided in the movable body.

In accordance with this invention, in the case that the structure is made, for example, such that the disc holder becomes at the closed position from the open position at a time of operating the operation knob so as to press the movable body and the disc holder becomes inversely at the open position from the closed position at a time of operating the operation knob so as to take in the movable body, all of the disc holders are simultaneously at the closed position only by setting the disc in the disc set portion and pressing the movable body by the operation knob, whereby the disc is held in the disc set portion so as not to fall away, and all the disc holders simultaneously move backward to the closed position only by taking in the movable body by the operation knob, whereby the disc holder does not stand in the way at a time of taking out the disc.

In accordance with the present invention, the member for interlocking the push pull operation of the movable body with the operation of moving in and out the disc holder can suitably employ various kinds of mechanisms such as a structure utilizing a broken type link corresponding to a swing member and the like in addition to a combination between the gear and the rack portion corresponding to the swing member mentioned above.

Further, in accordance with the present invention, it is desirable that the disc holders are arranged in a front side of the tray main body in which the disc set portion is formed in a front side, the swing members and the movable body are arranged in a back side of the tray main body, and the operation knob is connected to the movable body so as to be exposed to a front side of the tray main body from an opening portion provided in the tray main body. In accordance with this structure, there is an advantage that it is possible to operate the operation knob by one thumb holding the disc or the like.

Further, in accordance with the present invention, it is desirable that the respective disc holders are always elastically urged in a direction of returning to the closed position, and the respective disc holders are swung toward the open position from the closed position against the elastically urging force through the operation of the operation knob. In accordance with this structure, since it is sufficient to operate the operation knob by the fingers only at a time of setting the disc in the disc set portion or at a time of taking out the disc from the disc set portion, and the operation of returning the operation knob to the original position so as to return the disc holder to the closed position is automatically executed by an elastic force urging the disc holder, an operability of the operation knob at a time of setting the disc and at a time of taking out the disc is improved.

In accordance with the present invention, it is possible to employ the structure such that the respective disc holder execute an oscillating linear motion in a direction crossing the push pull direction of the movable body so as to move in and out between the closed position and the open position, the respective disc holders are always elastically urged toward the closed position side, sliding portions are provided in the respective disc holders, and the movable body is provided with an inclined working surface which executes a pressing operation and a moving-apart operation with respect to the sliding portion through the push pull operation so as to move the disc holders in and out through a displacement of the sliding portion. In this case, it is desirable that the disc holders are arranged in a front side of the tray main body in which a disc set portion is formed in a front side, a leg piece portion connected to the disc holders is inserted to an opening formed in the tray main body, the sliding portion and the movable body formed in the leg piece portion are arranged in a back side of the tray main body, and the operation knob is connected to the movable body so as to be exposed to the front side of the tray main body from an opening portion provided in the tray main body.

In accordance with this invention, it is possible to hold the disc set in the disc set portion by the disc holder so as not to fall away by pushing and pulling the movable body by means of the operation knob and prevent the disc holder from standing in the way of taking out the disc set in the disc set portion. Further, since it is sufficient to operate the operation knob by the fingers only at a time of setting the disc to the disc set portion and at a time of taking out the disc from the disc set portion, and the operation of returning the operation knob to the original position so as to set to the closed position can be automatically executed by the elastic force always urging the disc holder, an operability of the operation knob at a time of setting and taking out the disc can be improved. Further, in the structure in which the operation knob is exposed to the front side of the tray main body from the opening portion of the tray main body, there is an advantage that the operation knob can be operated by one thumb holding the disc.

Further, in accordance with the present invention, it is desirable that an elastic piece portion is formed by a protruding piece portion protruded out to a back side of the tray main body from an opening edge of the opening, the leg piece portion, and a curved portion connecting end portions of the protruding piece portion and the leg piece portion to each other, and the elastic piece portion, the disc holders and the tray main body are integrally formed by a synthetic resin.

In accordance with the structure mentioned above, since it is possible to form the elastic piece portion in a U shape and increase a total length thereof, it is possible to widely secure an amount of moving in and out the disc holder due to the elastic deformation of the protruding piece portion, the leg piece portion and the like which form the elastic piece portion. Accordingly, it is possible to increase a gap between the closed position and the open position in the disc holder so as to increase a stability of the operation of moving in and out the disc holder. Further, since the elastic piece portion, the disc holder and the tray main body are integrally formed by the synthetic resin, it is possible to restrict an increase of the number of the parts, whereby it is easy to achieve a cost reduction at that degree.

It is desirable that the movable body always elastically urges a working surface thereof in a returning direction for moving the working surface apart from the sliding portion. In accordance with this structure, since it is sufficient to operate the operation knob by the fingers only at a time of setting the disc to the disc set portion and at a time of taking out the disc from the disc set portion, and the operation of returning the operation knob to the original position so as to set to the closed position can be automatically executed by the elastic force always urging the disc holder toward the closed position side, an operability of the operation knob at a time of setting and taking out the disc can be improved.

In this case, the subject to be required to prevent the disc set to the disc set portion from falling away by means of the disc holder is mainly the disc tray equipped in the drive in the vertical attitude, however, there is a case that the drive is used in the horizontal attitude, and in such a case, it is desirable that the structure is made such that the disc holder is held at the open position and the disc is taken in and out the disc set portion without operating the operation knob.

In order to make the disc tray in accordance with the present invention correspond to this requirement, it is desirable that a holding member for holding the disc holders at the open position is provided. For example, it is possible to correspond to the requirement mentioned above by employing the structure such that the member includes a spacer detachably interposed between the operation knob and the opening edge portion of the opening portion exposing the operation knob to the front side of the tray main body, and the spacer is connected to any one of the operation knob and the tray main body.

DETAILED DESCRIPTION OF THE PREFERRED EMBODIMENTS

Mode for Carrying out the Invention

Figure 1:
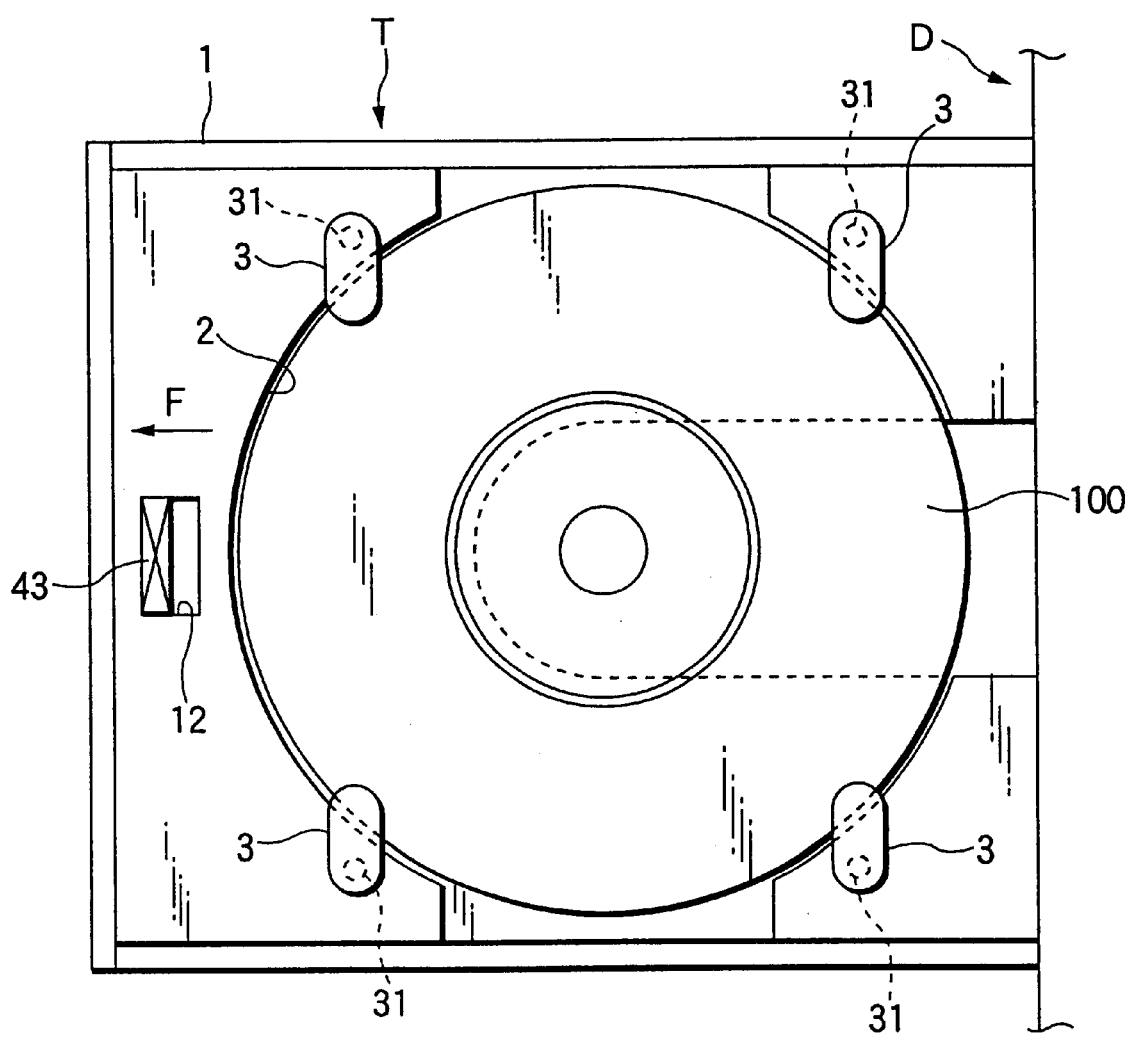
FIG. 1 is a front elevational view of a first embodiment of a disc tray in accordance with the present invention.
Figure 2:
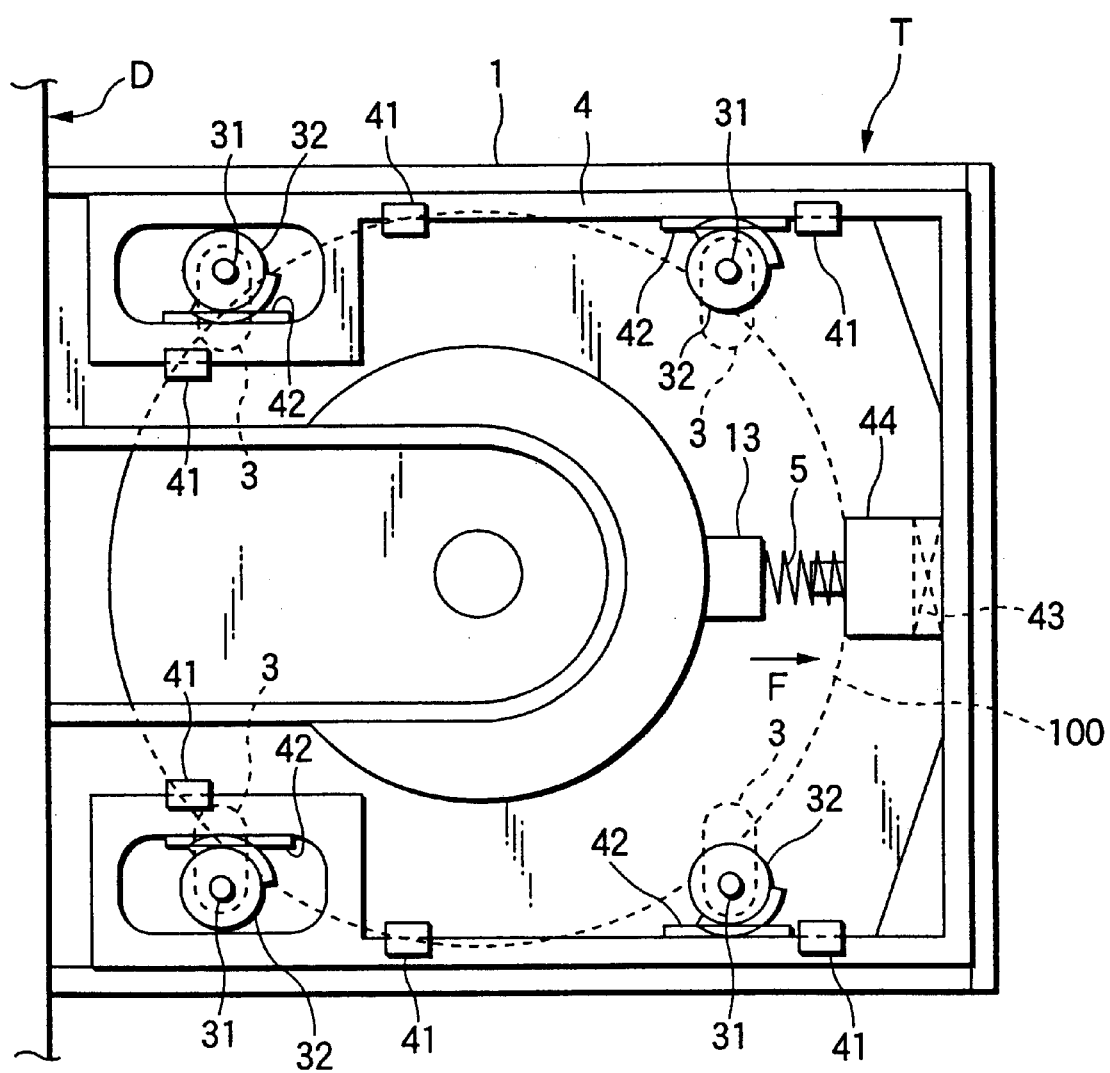
FIG. 2 is a back elevational view of the same.
Figure 3:
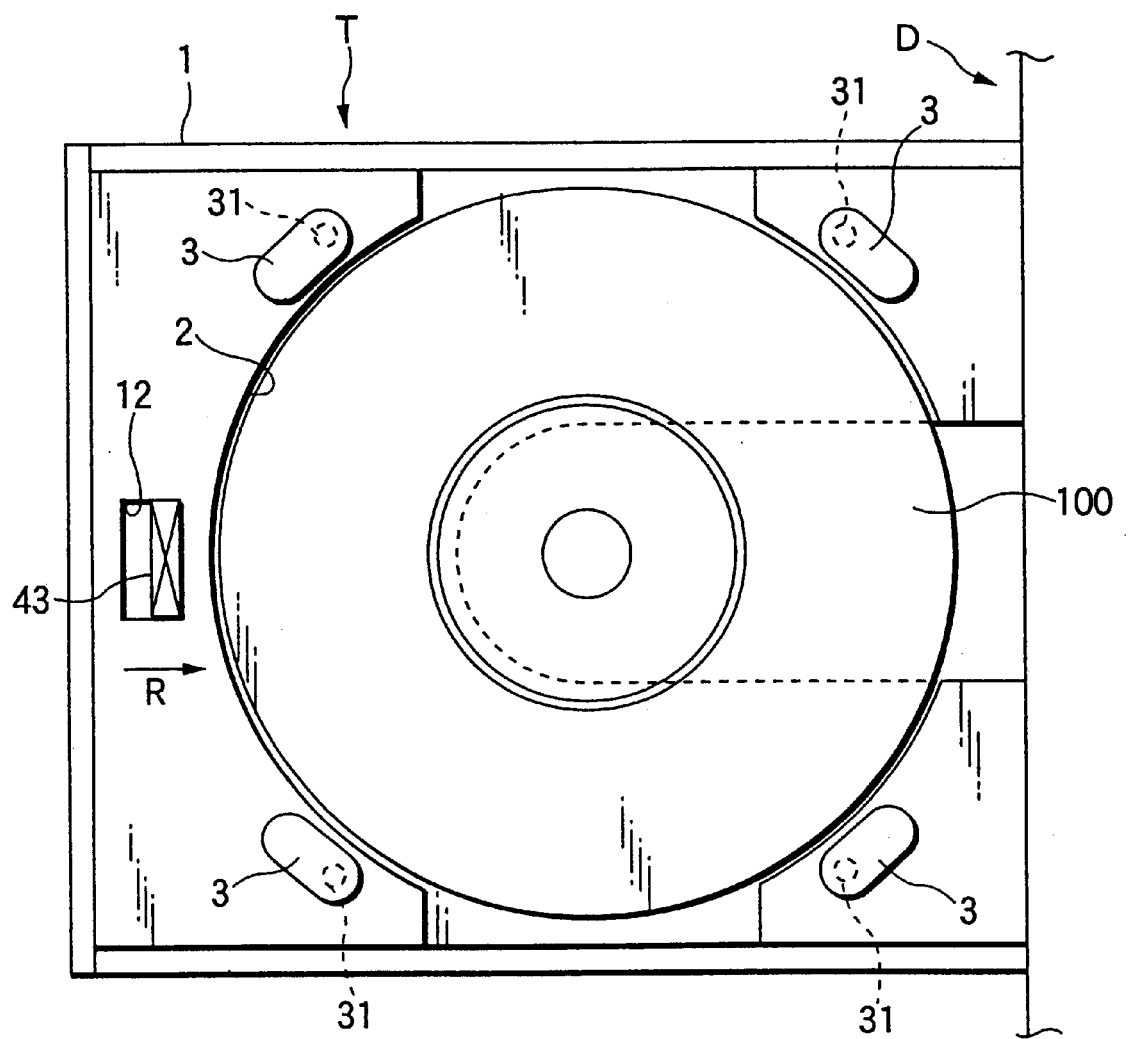
FIG. 3 is a front elevational view of the same in another state.
Figure 4:
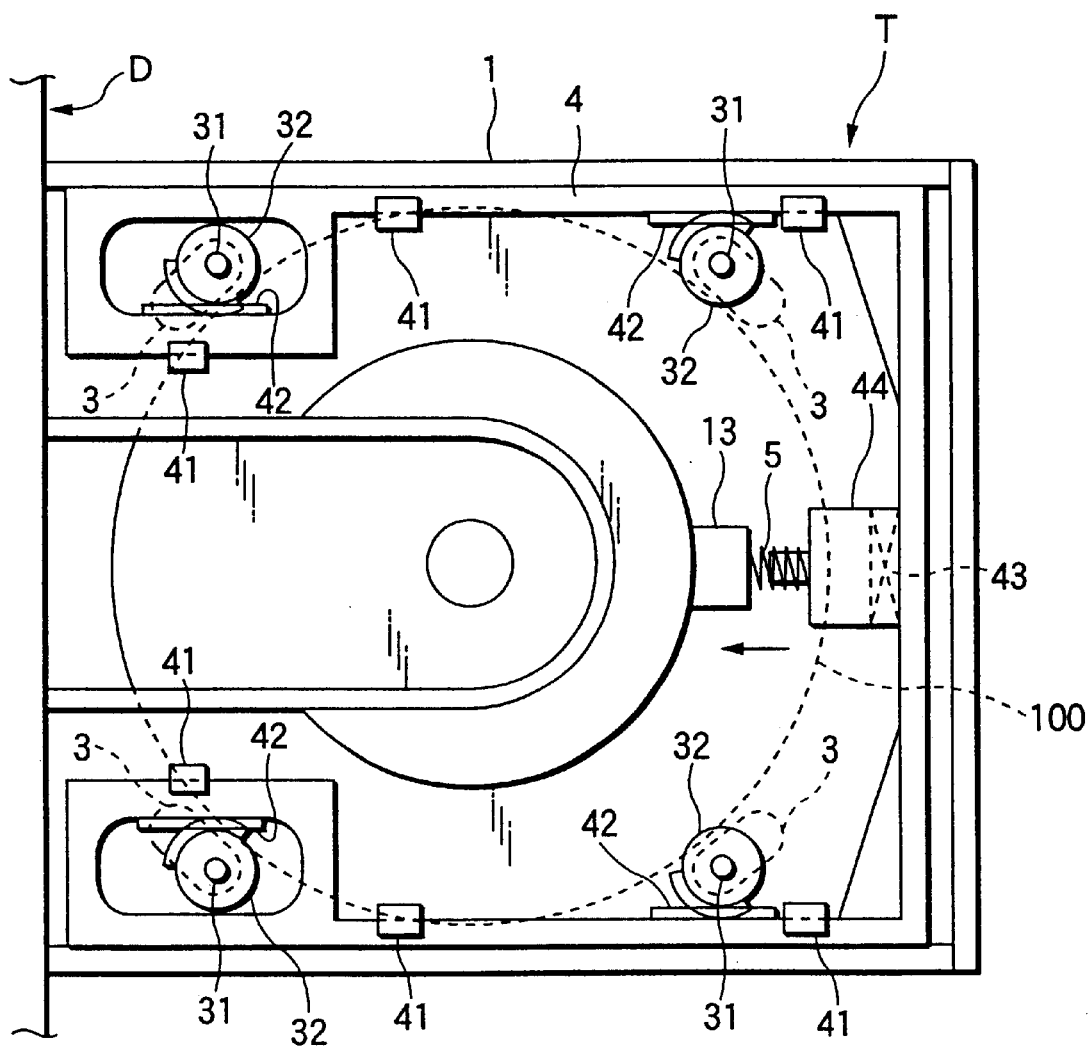
FIG. 4 is a back elevational view of the same in the other state.

FIG. 1 is a front elevational view of a first embodiment of a disc tray in accordance with the present invention, FIG. 2 is a back elevational view of the same, and FIG. 3 is a front elevational view of the same in another state, and FIG. 4 is a back elevational view of the same in a state of the other state.

A disc tray T in an illustrated embodiment is mounted to a drive D, and is pulled into the drive D or pushed out from the drive D by operating an operation button (not shown). The disc tray T has a tray main body 1 formed in a rectangular flat shape in a front elevational view, a disc set portion 2 formed by a circular recess is provided in a center portion in a front side of the tray main body 1, and hook-shaped disc holders 3, ... are attached to a plurality of portions (four portions in the illustrated embodiment) around the disc set portion 2. In particular, a rotary shaft 31 integrally formed with each of the disc holders 3 extends through and inserted to a through hole (not shown) provided in the tray main body 1 with no play. Accordingly, the disc holder 3 is structured such as to swing around the rotary shaft 31 corresponding to a center of swing between a closed position preventing a disc 100 set to the disc set portion 2 as shown in FIG. 1 from falling away and an open position moving backward to an outer side of the disc set portion 2 as shown in FIG. 3 so as to move in and out.

As shown in FIG. 2 or 4, a movable body 4 constituted by a frame body formed in a gate shape or a C shape is arranged in a back side of the tray main body 1 in a state of overlapping with the tray main body 1, and the movable body 4 is held at a plurality of portions by engagement pieces 41 protruded from suitable portions in the back side of the tray main body 1 so as to freely slide in a longitudinal direction without falling away. Rack portions 42 extending in a longitudinal direction are provided at a plurality of portions (four portions in the illustrated embodiment) of the movable body 4. Further, gears 32, ... independently engaging with the respective rack portions 42, ... are adhered to end portions of the rotary shafts 31. Accordingly, when executing the push pull operation that the movable body 4 is pushed in a direction of an arrow F in FIG. 2 or pulled in a direction of an arrow R in FIG. 4, the push pull operation is converted into a swing motion of the gear 32 via the rack portion 42, the swing motion of the gear mentioned above is transmitted to the disc holder 3 via the rotary shaft 31, and the disc holder 3 swings between the closed position and the open position. In accordance with this embodiment, it is defined so that all of the disc holders 3, ... simultaneously swing toward the closed position from the open position when the movable body 4 is pushed in the direction of the arrow F in FIG. 2, and all of the disc holders 3, ... simultaneously swing toward the open position from the closed position when the movable body 4 is pulled in the direction of the arrow R in FIG. 4.

A rectangular opening portion 12 is provided in a front-end portion of the tray main body 1. On the contrary, an operation knob 43 is provided in a front-end portion of the movable body 4, and the operation knob 43 is fitted to the opening portion 12 so as to be exposed to a front side of the tray main body 1. Further, spring receiving portions 13 and 44 are respectively provided in a back side of the tray main body 1 and a front end portion of the movable body 4, a spring body 5 constituted by a coil spring is interposed therebetween, and the movable body 4 is always urged toward a front portion, that is, toward a pressing direction due to an elastic force of the spring body 5. Since the elastic force of the spring body 5 is transmitted to the disc holder 3 from the movable body 4 via the rack portion 42, the gear 32 and the rotary shaft 31, each of the disc holders 3, ... is always urged toward a direction of returning to the closed position mentioned above due to the elastic force of the spring body 5.

In accordance with the disc tray T of the first embodiment structured in the manner mentioned above, all of the disc holders 3, ... are at the closed positions as shown in FIG. 1 at the normal time due to the elastic urging force of the spring body 5. When setting the disc 100 to the disc set portion 2 of the tray main body 1 from this state, the operation knob 43 is moved backward within the opening portion 12 as shown by the arrow R in FIGS. 3 and 4 by fingers. In accordance with this operation, since the movable body 4 is pulled backward against the urging force of the spring body 5 by the operation knob 43, all of the disc holders 3, ... simultaneously swing from the closed position to the open position. When inserting the disc 100 to the disc set portion 2 in a state of keeping all of the disc holders 3, ... in the open position and thereafter releasing the finger from the operation knob 43, the movable body 4 is pushed forward as shown in FIG. 2 due to the urging force of the spring body 5, and all of the disc holders 3, ... are returned to the closed position in accordance with the operation. In this state, it is possible to prevent the disc 100 from falling away from the disc set portion 2 by means of the disc holder 3.

At a time of taking out the disc 100 from the disc set portion 2, the movable body 4 is pulled backward against the urging force of the spring body 5 by moving the operation knob 43 backward within the opening portion 12 by the finger as shown by the arrow R in FIG. 3 or 4. In accordance with this operation, since all of the disc holders 3, ... simultaneously swing from the closed position to the open position, it is possible to take out the disc 100 from the disc set portion 2.

Since the pulling operation of the operation knob 43 at a time of taking in and out the disc 100 as mentioned above can be easily executed by one thumb holding the disc 100, it is possible to easily take the disc 100 in and out the disc set portion 2 by using only one hand.

In accordance with the first embodiment, the structure is made such that the gear 32 is forward and backward swung through the push pull operation of the movable body 4. Accordingly, the gear 32 serves as a swing member operating through the push pull operation of the movable body 4.

In accordance with the first embodiment, the disc holder 3 is always urged toward the closed position side due to the elastic force of the spring body 5, however, it is not always necessary that the structure is made so. That is, in the case that the disc holder 3 is not urged by the spring body 5, since the disc holder 3 becomes at the closed position or the open position in correspondence to the sliding direction of the movable body 4 by manually pushing or pulling the movable body 4 on the basis of the operation of the operation knob 43, the disc holder 3 may be set to the closed position or the open position by suitably selecting the moving direction of the movable body 4 on the basis of the operation of the operation knob 43.

Figure 5:
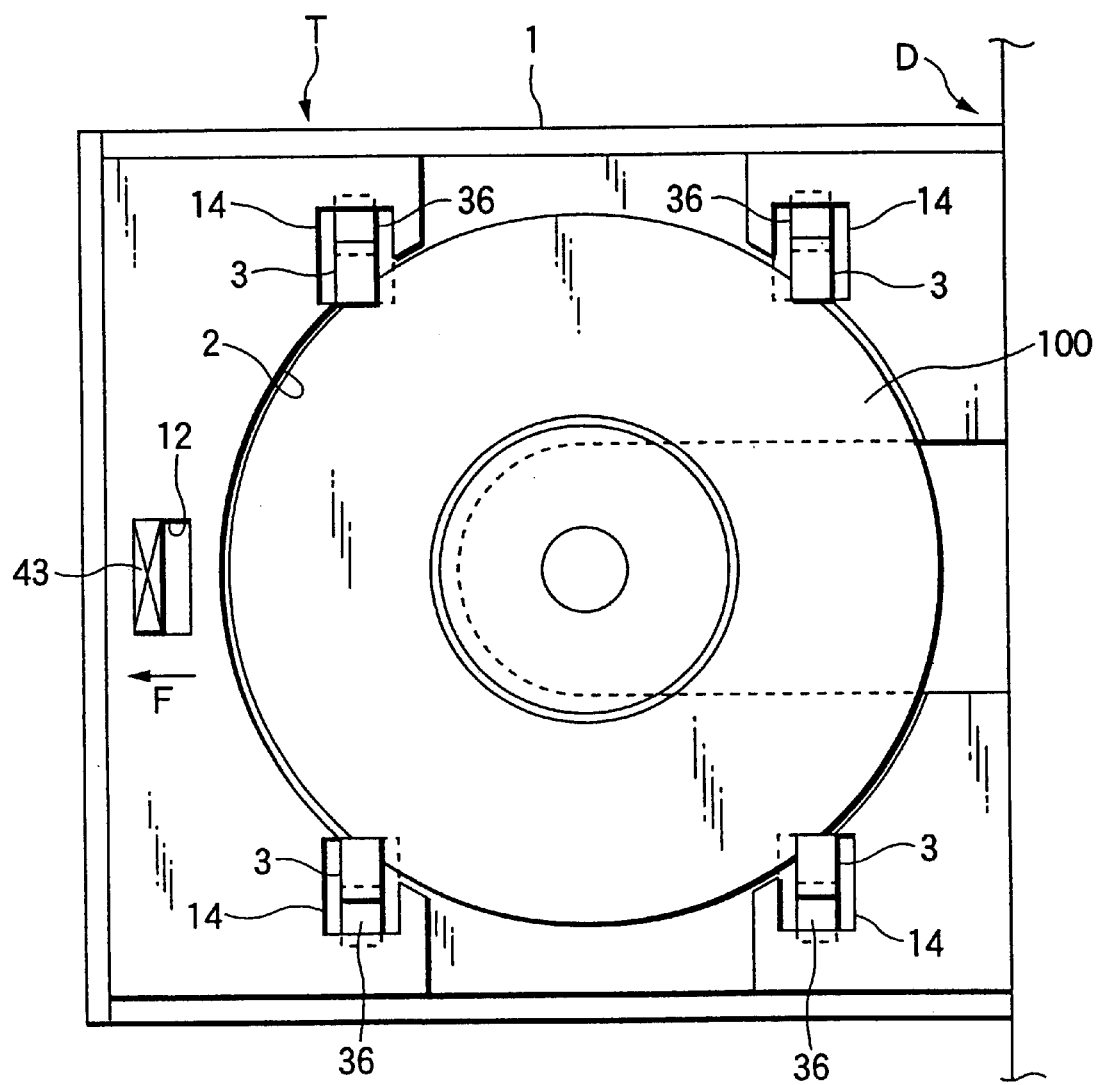
FIG. 5 is a front elevational view of a second embodiment of the disc tray in accordance with the present invention.
Figure 6:
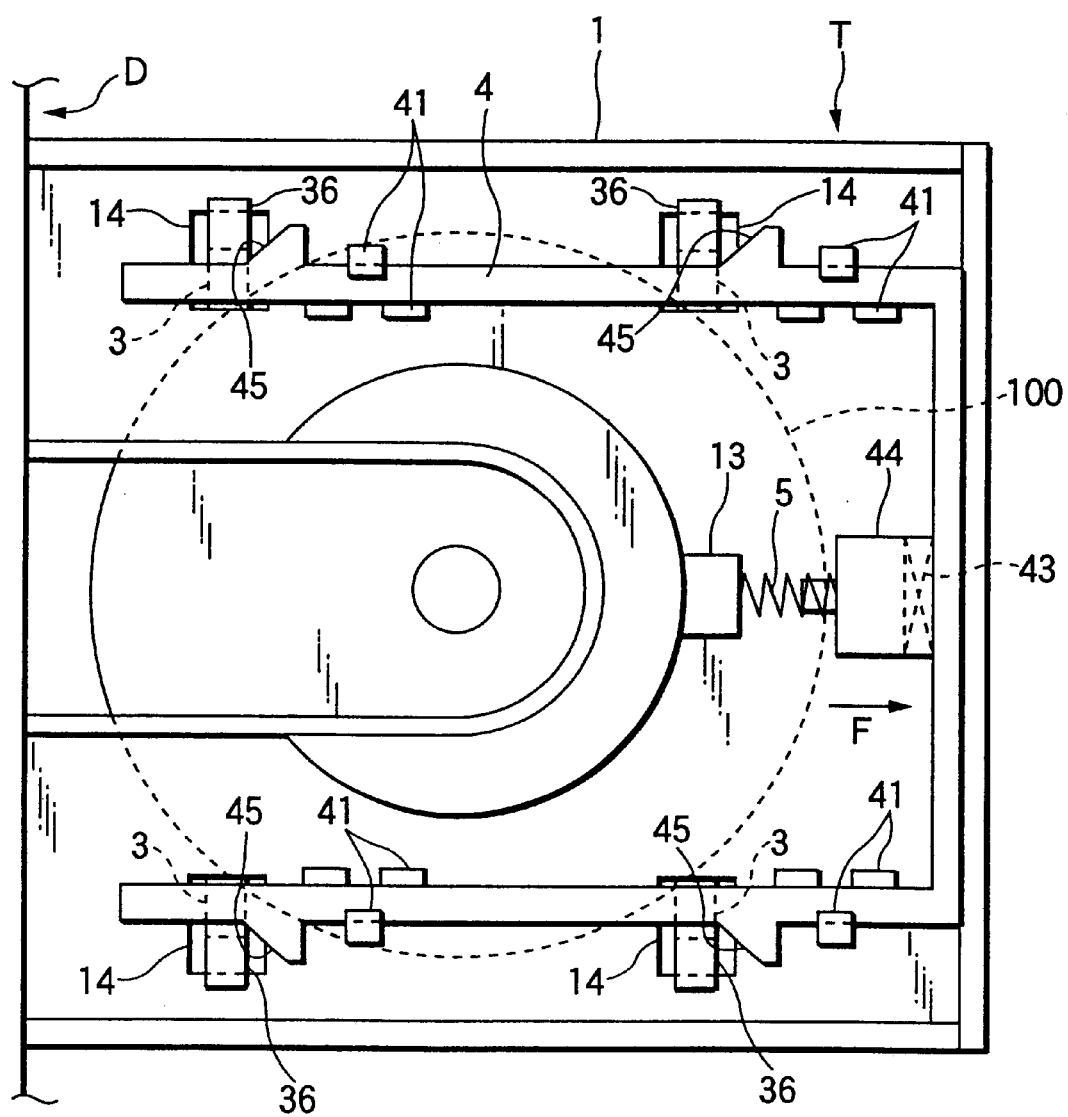
FIG. 6 is a back elevational view of the same.
Figure 7:
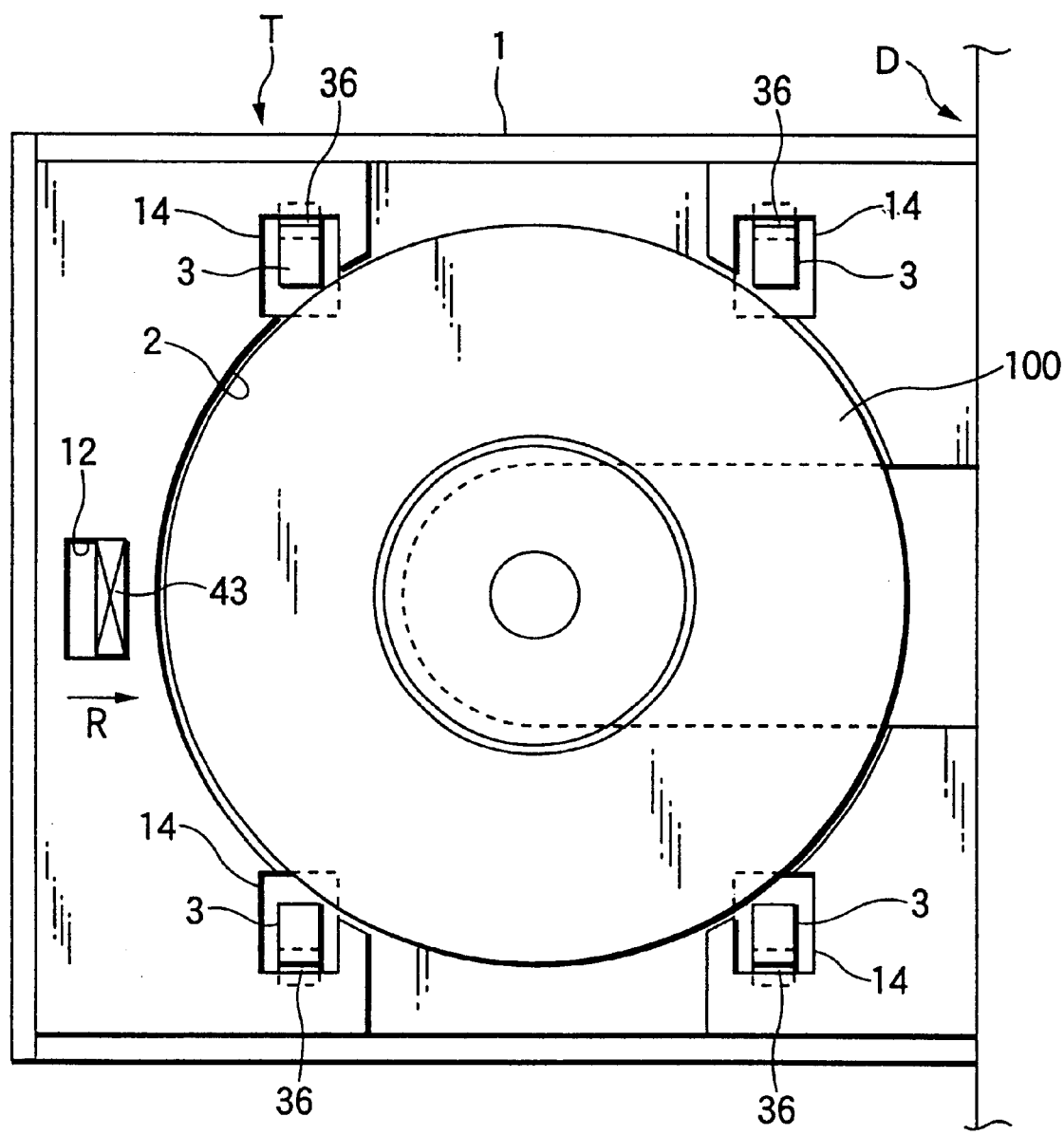
FIG. 7 is a front elevational view of the same in another state.
Figure 8:
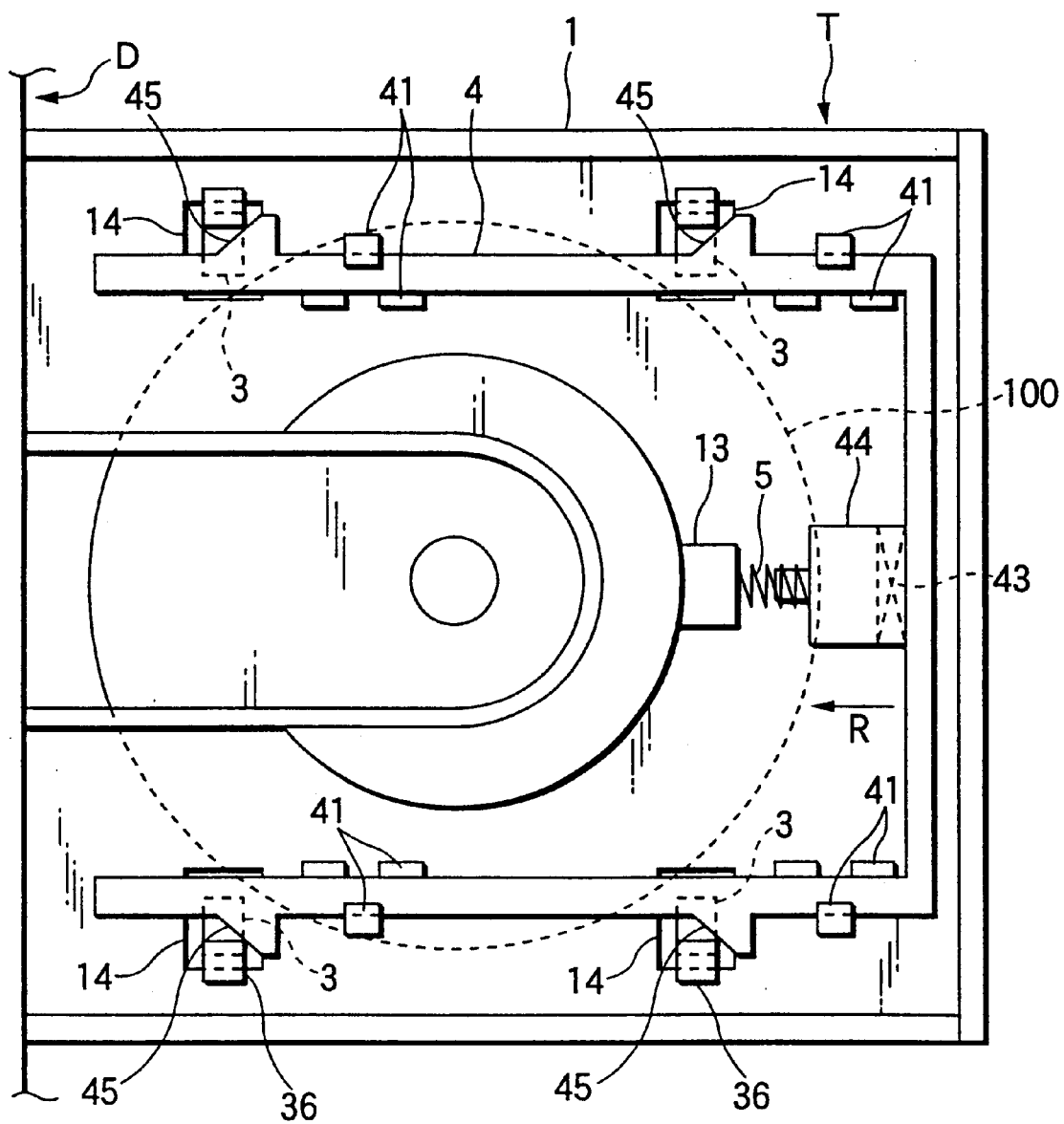
FIG. 8 is a back elevational view of the same in the other state.
Figure 9:
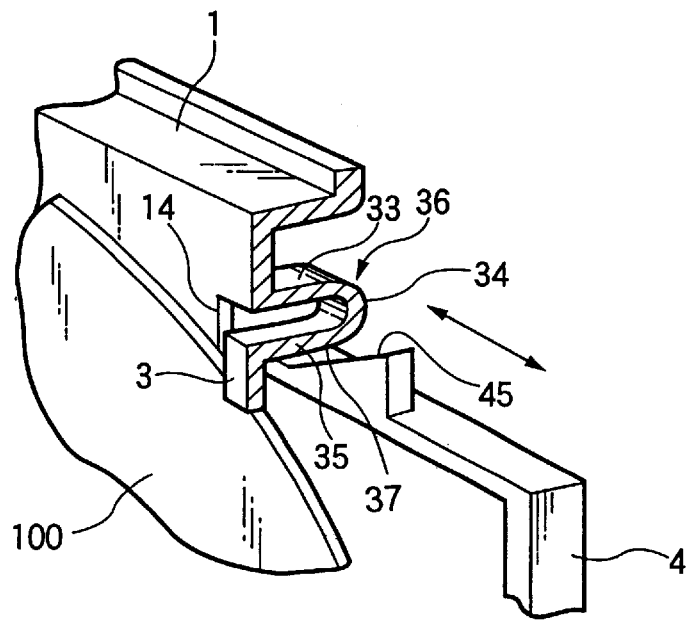
FIG. 9 is an enlarged perspective view in which a main portion is shown in a broken manner.

FIG. 5 is a front elevational view of a second embodiment of a disc tray in accordance with the present invention, FIG. 6 is a back elevational view of the same, and FIG. 7 is a front elevational view of the same in another state, FIG. 8 is a back elevational view of the same in a state of the other state, and FIG. 9 is an enlarged perspective view in which a main portion is shown in a broken manner.

This second embodiment is the same as the first embodiment in a point that a disc tray T is mounted to a drive D, and is pulled into the drive D or pushed out from the drive D by operating an operation button (not shown), a point that the disc tray T has a tray main body 1 formed in a rectangular flat shape in a front elevational view, a disc set portion 2 formed by a circular recess is provided in a center portion in a front side of the tray main body 1, and hook-shaped disc holders 3, . . . are attached to a plurality of portions (four portions in the illustrated embodiment) around the disc set portion 2, a point that a movable body is provided, and the like.

In the disc tray T in accordance with the second embodiment, an opening 14 is formed in a portion for arranging each of the disc holders 3, . . . as shown in FIG. 9, in the tray main body 1. Further, a U-shaped elastic piece portion 36 is formed by a protruding piece portion 33 protruded out to the back side of the tray main body 1 from an opening edge of the opening 14 and a leg piece portion 35 connected to the protruding piece portion 33 via a curved portion 34 and inserted to the opening 14, and the sheet-like disc holder 3 arranged in the front side of the tray main body 1 is connected to the leg piece portion 35 of the elastic piece portion 36. In this case, the elastic piece portion 36, the disc holder 3 and the tray main body 1 are integrally formed by the synthetic resin. In this case, the opening 14 corresponds to a die cutting trace at a time of integrally forming the elastic piece portion 36 and the disc holder 3.

The disc holder 3 structured in the manner mentioned above can execute an oscillating liner motion within a fixed range through an elastic deformation of the elastic piece portion 36, and can move in and out between a closed position of preventing the disc 100 set to the disc set portion 2 in the tray main body 1 from falling away and an open position making it possible to move the disc 100 in and out the disc set portion 2 due to the oscillating linear motion mentioned above. Further, when the disc holder 3 moves backward to the open position side if any, the disc holder 3 is elastically urged toward the closed position side due to a property of the synthetic resin forming the elastic piece portion 36.

As shown in FIG. 6 or 8, a movable body 4 constituted by a frame body formed in a gate shape or a C shape is arranged in a back side of the tray main body 1 in a state of overlapping with the tray main body 1, and the movable body 4 is held at a plurality of portions by engagement pieces 41 protruded from the back side of the tray main body 1 so as to freely slide in a longitudinal direction without falling away. In this case, the direction of moving in and out the disc holder 3 is vertical to the push pull operation direction (the longitudinal direction) of the movable body 4. Further, inclined working surfaces 45 are provided at a plurality of portions (four portions in the illustrated embodiment) of the movable body 4, and sliding portions 37 corresponding to the working surfaces 45 are provided in the leg piece portion 35 of the elastic piece portion 36 mentioned above. Accordingly, when executing the push pull operation that the movable body 4 is pushed in a direction of an arrow F in FIG. 6 or pulled in a direction of an arrow R in FIG. 8, the working surface 45 presses the sliding portion 37 due to the push pull operation so as to elastically deform the elastic piece portion 36, and the working surface 45 moves apart from the sliding portion 37 so as to return the elastic piece portion 36. Further, when the sliding portion 37 is pressed by the working surface 45 and the elastic piece portion 36 elastically deforms, the disc holder 3 moves backward to the open position from the closed position, and when the sliding portion 37 moves apart from the working surface 45 and the elastic piece portion 36 is returned, the disc holder 3 protrudes out to the closed position from the open position. The operation mentioned above is simultaneously executed with respect to all of the disc holders 3, . . . .

A rectangular opening portion 12 is provided in a front end portion of the tray main body 1, and an operation knob 43 provided in a front end portion of the movable body 4 is fitted to the opening portion 12 so as to be exposed to a front side of the tray main body 1, in the same manner as that described with respect to the first embodiment. Further, a spring body 5 constituted by a coil spring is interposed between a spring receiving portion 13 in the back side of the tray main body 1 and a spring receiving portion 44 in the front end portion of the movable body 4, and the movable body 4 is always urged toward a pressing direction due to an elastic force of the spring body 5, in the same manner as that described with respect to the first embodiment. Due to the urging force of the spring body 5, the movable body 4 is always elastically urged in the returning direction of moving the working surface 45 apart from the sliding portion In accordance with the disc tray T of the second embodiment structured in the manner mentioned above, all of the disc holders 3, . . . are at the closed positions as shown in FIG. 5 at the normal time due to the elasticity of the elastic piece portions 36, . . . themselves. When setting the disc 100 to the disc set portion 2 of the tray main body 1 from this state, the operation knob 43 is moved backward within the opening portion 12 as shown by the arrow R in FIGS. 7 and 8 by fingers. In accordance with this operation, since the movable body 4 is pulled backward against the urging force of the spring body 5 by the operation knob 43, all of the disc holders 3, . . . simultaneously swing from the closed position to the open position. When inserting the disc 100 to the disc set portion 2 in a state of keeping all of the disc holders 3, . . . in the open position and thereafter releasing the finger from the operation knob 43, the movable body 4 is pushed forward as shown in FIG. 2 due to the urging force of the spring body 5, and all of the disc holders 3, . . . are returned to the closed position with respect to the surface of the disc 100 set to the disc set portion 2. In this state, it is possible to prevent the disc 100 from falling away from the disc set portion 2 by means of the disc holder 3.

At a time of taking out the disc 100 from the disc set portion 2, the movable body 4 is pulled backward against the urging force of the spring body 5 by moving the operation knob 43 backward within the opening portion 12 by the finger as shown by the arrow R in FIG. 7 or 8. In accordance with this operation, since all of the disc holders 3, . . . simultaneously moves backward from the closed position to the open position, it is possible to take out the disc 100 from the disc set portion 2 without being stood in the way by the disc holder 3.

Since the pulling operation of the operation knob 43 at a time of taking the disc 100 in and out the disc set portion 2 as mentioned above can be easily executed by one thumb holding the disc 100, it is possible to easily take the disc 100 in and out the disc set portion 2 by using only one hand.

Figure 10:
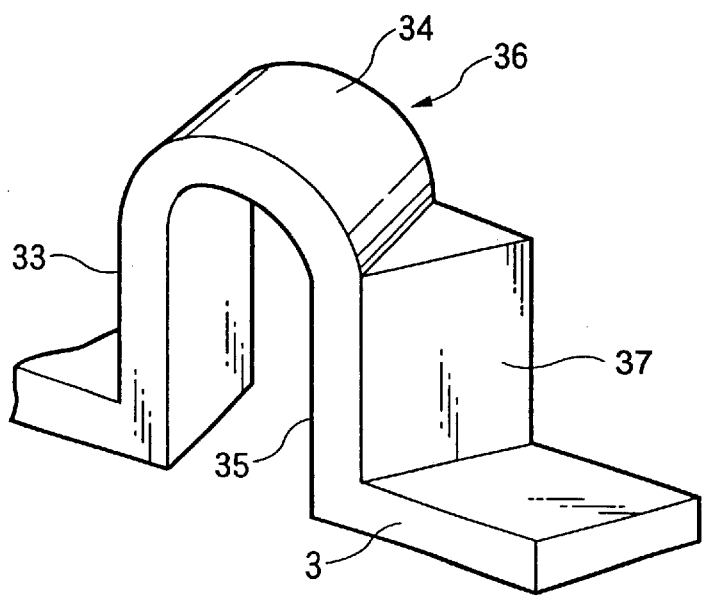
FIG. 10 is a perspective view showing a desirable shape of a sliding portion.

In accordance with the second embodiment, the structure may be made such that the sliding portion 37 provided in the leg piece portion 35 of the elastic piece portion 36 is formed in an inclined surface as shown in FIG. 10 and the inclined surface slides with the working surface 45 in the side of the movable body 4, and an operation stability is accordingly improved.

The first embodiment and the second embodiment mentioned above can effectively prevent the disc 100 set to the disc set portion 2 from falling away by being applied to the disc tray T equipped in the drive in the vertical attitude. However, in the case of using the drive in the horizontal attitude, it is not preferable for the reason of standing in the way of taking in and out the disc that the normal position of the disc holder 3 is at the closed position mentioned above. Accordingly, in each of the disc trays in accordance with the first embodiment and the second embodiment, taking the matter that the drive is used in the horizontal attitude into consideration, it is desirable that a member capable of always holding the disc holder 3 at the open position is provided.

Figure 11:
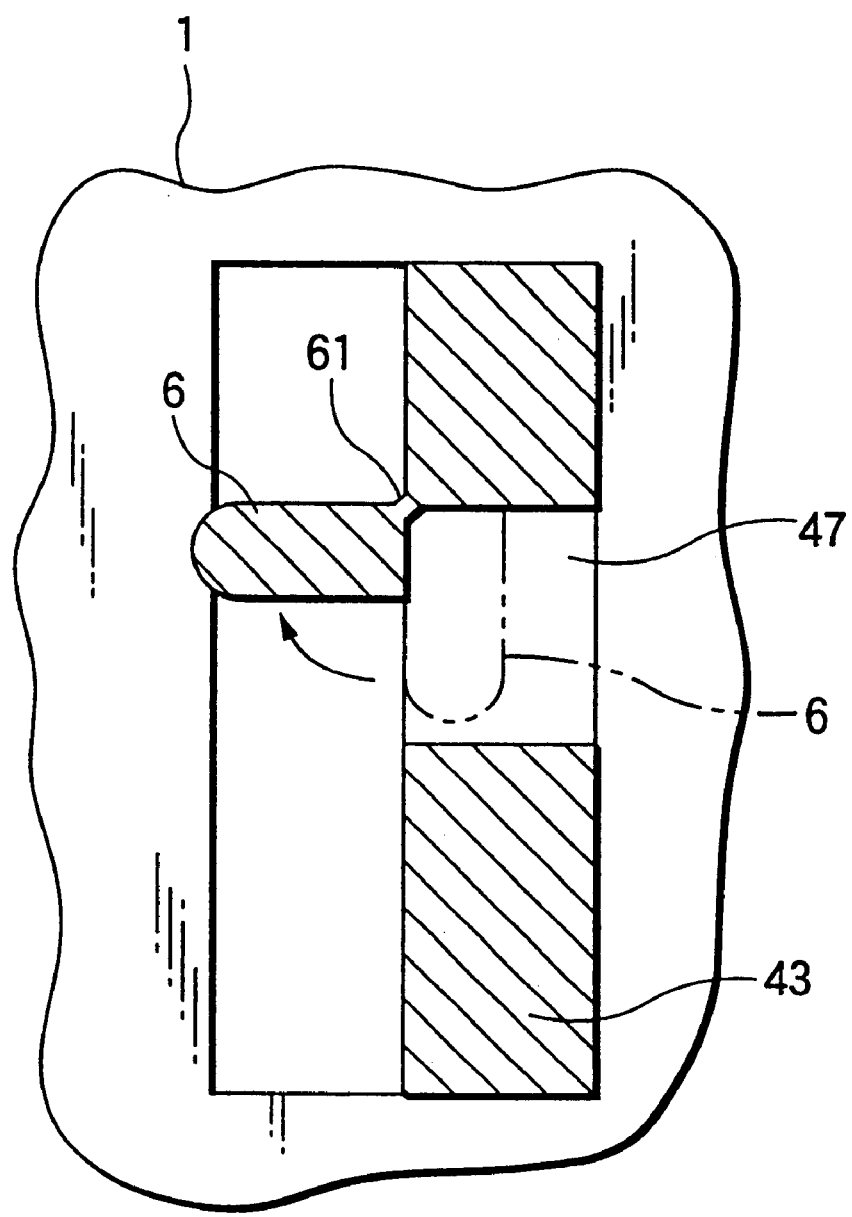
FIG. 11 is a schematic view exemplifying a holding member for holding a disc holder at an open position.

The member mentioned above is exemplified in FIG. 11. That is, the illustrated member includes a spacer 6 detachably interposed between the operation knob 43 and the opening edge portion of the opening portion 12 exposing the operation knob 43 to the front side of the tray main body 1, and the spacer 6 is connected to the operation knob 43 via the plastic hinge 61. Accordingly, since the disc holder 3 is always held at the open position by protruding out the spacer 6 from the operation knob 43 pulled backward so as to bring the spacer into contact with the opening edge portion of the opening portion 12 as shown in FIG. 11, the disc holder 3 does not stand in the way at a time of moving the disc 100 in and out the disc set portion 2. In this case, when the drive is used in the vertical attitude, it is sufficient to receive the spacer 6 in a space 47 formed in the operation knob 43 as shown by an imaginary line in FIG. 11.

In this case, in FIGS. 1 to 11, in order to avoid an overlapping description, the same reference numerals are attached to the same or corresponding portions.

Effect of the Invention

As mentioned above, in accordance with the present invention, since the disc holders at a plurality of portions simultaneously operate in the same manner only by operating one operation knob at a time of attaching and detaching the disc, whereby it is possible to set the disc to the disc set portion without falling away and safely take out the disc from the disc set portion, it is unnecessary to execute the troublesome operation of individually operating the disc holders one by one as in the conventional manner and a usability can be improved at that degree. Further, there is an advantage that it is possible to set the disc to the disc set portion and take out the disc from the disc set portion by using only one hand. Further, in the case of using the drive in the horizontal attitude in which the disc is not required to be held by the disc holder, since it is possible to take the disc holder away from the position standing in the way of moving in and out the disc, the drive equipped with the disc tray in accordance with the present invention can be applied to the vertical attitude and the horizontal attitude.

What is claims is:

1. A disc tray comprising:
   a tray main body to which disc holders are mounted at a plurality of portions in the periphery of a disc set portion so as to be capable of moving in and out between a closed position for preventing a disc set in said disc set portion from falling down and an open position for being capable to take the disc in and out the disc set portion,
   a movable body simultaneously moving each of said disc holders in and out between the closed position and the open position through a push pull operation, and
   an operation knob for pushing and pulling said movable body.

2. The disc tray as claimed in claim 1, wherein
   said respective disc holders swing so as to move in and out between the closed position and the open position,
   swing center portions of said respective disc holders and swing members corresponding to said respective disc holders are respectively connected to each other via respective rotary shafts rotatably extending through and inserted to a plurality of portions of said tray main body, and
   said movable body has a function of simultaneously moving said respective disc holders between the closed position and the open position via said respective rotary shafts by forward and backward swinging said respective swing members through the push pull operation.

3. The disc tray as claimed in claim 2, wherein
   said swing member are gears, and
   rack portions engaged with said gears forming said respective swing members are provided in said movable body.

4. The disc tray as claimed in claim 2, wherein
   said disc holders are arranged in a front side of said tray main body in which the disc set portion is formed in a front side,
   said swing members and said movable body are arranged in a back side of said tray main body, and
   said operation knob is connected to said movable body to be exposed to a front side of said tray main body from an opening portion provided in said tray main body.

5. The disc tray as claimed in claim 1, wherein
   said respective disc holders are always elastically urged in a direction of returning to the closed position, and
   said respective disc holders are swung toward the open position from the closed position against the elastically urging force through the operation of said operation knob.

6. The disc tray as claimed in claim 1, wherein
   said respective disc holder execute an oscillating linear motion in a direction crossing the push pull direction of said movable body so as to move in and out between the closed position and the open position,
   said respective disc holders are always elastically urged toward the closed position side,
   sliding portions are provided in said respective disc holders, and
   said movable body is provided with an inclined working surface which executes a pressing operation and a moving-apart operation with respect to said sliding portion through the push pull operation to move said disc holders in and out through a displacement of said sliding portion.

7. The disc tray as claimed in claim 6, wherein
   said disc holders are arranged in a front side of said tray main body in which a disc set portion is formed in a front side,
   a leg piece portion connected to said disc holders is inserted to an opening formed in said tray main body,
   said sliding portion is formed in the leg piece portion and arranged in a back side of said tray main body, and said operation knob is connected to said movable body to be exposed to the front side of said tray main body from an opening portion provided in said tray main body.

8. The disc tray as claimed in claim 7, wherein an elastic piece portion is formed by a protruding piece portion protruded out to a back side of said tray main body from an opening edge of the opening, said leg piece portion, and a curved portion connecting end portions of the protruding piece portion and the leg piece portion to each other, and said elastic piece portion, said disc holders and said tray main body are integrally formed by a synthetic resin.

9. The disc tray as claimed in claim 6, wherein a working surface of said movable body is always elastically urged in a returning direction for moving the working surface apart from said sliding portion.

10. The disc tray as claimed in claim 1, further comprising:

a holding member for holding said disc holders at the open position.

11. The disc tray as claimed in claim 10, wherein said holding member includes a spacer detachably interposed between said operation knob and an opening edge portion of an opening portion exposing said operation knob to the front side of said tray main body, and said spacer is connected to any one of said operation knob and said tray main body.

* * * * *